(12) United States Patent
Lee et al.

(10) Patent No.: US 12,255,327 B2
(45) Date of Patent: Mar. 18, 2025

(54) POSITIVE ELECTRODE ACTIVE MATERIAL, METHOD OF PREPARING THE POSITIVE ELECTRODE ACTIVE MATERIAL, AND POSITIVE ELECTRODE AND LITHIUM SECONDARY BATTERY WHICH INCLUDE THE POSITIVE ELECTRODE ACTIVE MATERIAL

(71) Applicant: LG Chem, Ltd., Seoul (KR)

(72) Inventors: Dong Hun Lee, Daejeon (KR); Sung Bin Park, Daejeon (KR); Hyung Man Cho, Daejeon (KR); Jung Min Han, Daejeon (KR); Jin Tae Hwang, Daejeon (KR); Wang Mo Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 703 days.

(21) Appl. No.: 17/413,100

(22) PCT Filed: Jan. 7, 2020

(86) PCT No.: PCT/KR2020/000297
§ 371 (c)(1),
(2) Date: Jun. 11, 2021

(87) PCT Pub. No.: WO2020/145639
PCT Pub. Date: Jul. 16, 2020

(65) Prior Publication Data
US 2022/0013775 A1    Jan. 13, 2022

(30) Foreign Application Priority Data

Jan. 7, 2019    (KR) .................. 10-2019-0001843

(51) Int. Cl.
*H01M 4/525*    (2010.01)
*H01M 4/04*    (2006.01)
(Continued)

(52) U.S. Cl.
CPC .......... *H01M 4/525* (2013.01); *H01M 4/0471* (2013.01); *H01M 4/505* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | |
|---|---|---|
| 10,892,471 B2 | 1/2021 | Choi et al. |
| 2003/0211235 A1 | 11/2003 | Suh et al. |

(Continued)

FOREIGN PATENT DOCUMENTS

| | | |
|---|---|---|
| CN | 1458705 A | 11/2003 |
| CN | 101944610 A | 1/2011 |

(Continued)

OTHER PUBLICATIONS

Sun et al., Journal of Materials Chemistry, 2011, 21, 10108. (Year: 2011).*

(Continued)

*Primary Examiner* — Zhongqing Wei
(74) *Attorney, Agent, or Firm* — Lerner David LLP (57) ABSTRACT

A positive electrode active material includes a nickel-based lithium transition metal oxide containing nickel in an amount of 60 mol % or more based on a total number of moles of metals excluding lithium, wherein cobalt is included in an amount of greater than 0 ppm to 6,000 ppm or less on a surface of the nickel-based lithium transition metal oxide. A method of preparing the positive electrode active material, a positive electrode for a lithium secondary battery and a lithium secondary battery which includes the positive electrode active material are also provided.

5 Claims, 1 Drawing Sheet

(51) Int. Cl.
  *H01M 4/505* (2010.01)
  *H01M 10/0525* (2010.01)
  *H01M 4/02* (2006.01)

(56) References Cited

U.S. PATENT DOCUMENTS

| | | |
|---|---|---|
| 2008/0182170 A1 | 7/2008 | Rong et al. |
| 2009/0098278 A1 | 4/2009 | Suh et al. |
| 2013/0037742 A1 | 2/2013 | Oda et al. |
| 2014/0205898 A1 | 7/2014 | Lee et al. |
| 2015/0053890 A1 | 2/2015 | Sun |
| 2015/0357638 A1 | 12/2015 | Sun et al. |
| 2017/0133668 A1 | 5/2017 | Kim et al. |
| 2018/0159117 A1 | 6/2018 | Oda et al. |
| 2019/0020026 A1 | 1/2019 | Choi et al. |
| 2019/0214628 A1 | 7/2019 | Choi et al. |

FOREIGN PATENT DOCUMENTS

| | | |
|---|---|---|
| CN | 103872328 A | 6/2014 |
| CN | 109088067 A | 12/2018 |
| JP | H07235292 A | 9/1995 |
| JP | H10236826 A | 9/1998 |
| JP | 2006156126 A | 6/2006 |
| JP | 5871186 B2 | 3/2016 |
| JP | 2016051503 A | 4/2016 |
| JP | 2018014208 A | 1/2018 |
| KR | 20080005995 A | 1/2008 |
| KR | 20140093529 A | 7/2014 |
| KR | 20150116222 A * | 10/2015 |
| KR | 20160010630 A | 1/2016 |
| KR | 101676687 B1 | 11/2016 |
| KR | 20170053368 A | 5/2017 |
| KR | 20170081950 A | 7/2017 |
| KR | 101785266 B1 | 11/2017 |
| KR | 20180074340 A | 7/2018 |
| KR | 20180091754 A | 8/2018 |
| KR | 20180114412 A | 10/2018 |
| WO | 2011099494 A1 | 8/2011 |

OTHER PUBLICATIONS

Hou et al., Journal of Materials Chemistry A, 2019, 7, 4705-4713. (Year: 2019).*

Extended European Search Report including Written Opinion for Application No. 20738315.9 dated Feb. 14, 2022, pp. 1-8.

Hou, P. et al., "Mitigating the P2-O2 phase transition of high-voltage P2-Na ⅔[Ni ⅓ Mn ⅔ ]O2 cathodes by cobalt gradient substitution for high-rate sodium-ion batteries," Journal of Materials Chemistry A, Jan. 2019, pp. 4705-4713, vol. 7. XP055886348.

Sun, Y. et al., "A novel concentration-gradient Li[Ni0.83Co0.07Mn0.10]O2 cathode material for high-energy lithium-ion batteries," Journal of Materials Chemistry, Jan. 2011, pp. 10108-10112, vol. 21. XP055092893.

International Search Report for Application No. PCT/KR2020/000297, dated Apr. 14, 2020, 3 pages.

Search Report dated May 30, 2024 from Office Action for Chinese Application No. 202080006871.8 issued Jun. 1, 2024. 2 pgs.

* cited by examiner

POSITIVE ELECTRODE ACTIVE MATERIAL, METHOD OF PREPARING THE POSITIVE ELECTRODE ACTIVE MATERIAL, AND POSITIVE ELECTRODE AND LITHIUM SECONDARY BATTERY WHICH INCLUDE THE POSITIVE ELECTRODE ACTIVE MATERIAL

CROSS-REFERENCE TO RELATED APPLICATIONS

This application is a national phase entry under 37 U.S.C. § 371 of International Application No. PCT/KR2020/000297, filed on Jan. 7, 2020, which claims priority from Korean Patent Application No. 10-2019-0001843, filed on Jan. 7, 2019, the disclosures of which are incorporated by reference herein.

TECHNICAL FIELD

The present invention relates to a positive electrode active material for a lithium secondary battery, a method of preparing the same, and a positive electrode and a lithium secondary battery which include the positive electrode active material.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

In the lithium secondary battery in a state in which an organic electrolyte solution or a polymer electrolyte solution is filled between a positive electrode and a negative electrode which are respectively formed of active materials capable of intercalating and deintercalating lithium ions, electrical energy is produced by oxidation and reduction reactions when the lithium ions are intercalated/deintercalated into/from the positive electrode and the negative electrode.

Lithium cobalt oxide ($LiCoO_2$), lithium nickel oxide ($LiNiO_2$), lithium manganese oxide ($LiMnO_2$ or $LiMn_2O_4$, etc.), a lithium iron phosphate compound ($LiFePO_4$), or a lithium composite metal oxide (hereinafter, simply referred to as 'NCM-based lithium composite transition metal oxide' or 'NCA-based lithium composite transition metal oxide'), in which a portion of nickel (Ni) is substituted with cobalt (Co) or manganese (Mn)/aluminum (Al), has been used as a positive electrode active material of the lithium secondary battery.

Particularly, among these oxides, a lithium cobalt composite metal oxide, such as $LiCoO_2$, having a high operating voltage and excellent capacity characteristics has been mainly used. However, since the $LiCoO_2$ has poor thermal properties due to an unstable crystal structure caused by delithiation and uses expensive cobalt, there has been a limitation in using a large amount of the $LiCoO_2$ as a power source for applications such as electric vehicles.

Thus, there is a need to develop a positive electrode active material in which a manufacturing unit price is not only reduced by reducing an amount of the cobalt, but excellent capacity characteristics are also obtained without using the cobalt.

DISCLOSURE OF THE INVENTION

Technical Problem

An aspect of the present invention provides a positive electrode active material in which, since cobalt is not included in a center portion of a positive electrode active material particle but is included in a trace amount only in a surface portion thereof, a manufacturing unit price of a secondary battery may not only be reduced according to a reduction in amount of the expensive cobalt, but surface resistance is also improved.

Another aspect of the present invention provides a method of preparing the positive electrode active material.

Another aspect of the present invention provides a positive electrode including the positive electrode active material.

Another aspect of the present invention provides a lithium secondary battery including the positive electrode for a lithium secondary battery.

Technical Solution

According to an aspect of the present invention, there is provided a positive electrode active material including: a nickel-based lithium transition metal oxide containing nickel in an amount of 60 mol % or more based on a total number of moles of metals excluding lithium, wherein cobalt is included in an amount of greater than 0 ppm to 6,000 ppm or less on a surface of the nickel-based lithium transition metal oxide.

According to another aspect of the present invention, there is provided a method of preparing a positive electrode active material which includes: preparing a transition metal hydroxide which contains nickel in an amount of 60 mol % or more based on a total number of moles of transition metals and does not contain cobalt; and mixing the transition metal hydroxide and a lithium raw material and sintering the mixture, wherein the method further includes mixing a cobalt (Co) raw material in an amount such that an amount of the Co in the finally prepared positive electrode active material is in a range of greater than 0 ppm to 6,000 ppm or less in the mixing of the transition metal hydroxide and the lithium raw material and the sintering of the mixture, or after the sintering.

According to another aspect of the present invention, there is provided a method of preparing a positive electrode active material which includes: preparing a transition metal aqueous solution containing a nickel raw material and a cobalt raw material; preparing a transition metal hydroxide by a co-precipitation reaction of the transition metal aqueous solution; and mixing the transition metal hydroxide and a lithium raw material and sintering the mixture, wherein the nickel raw material is included in an amount such that an atomic ratio of nickel is 60 mol % or more based on a total number of moles of transition metals in the transition metal aqueous solution, and the cobalt raw material is mixed in an amount such that an amount of Co in the finally prepared positive electrode active material is in a range of greater than 0 ppm to 6,000 ppm or less.

According to another aspect of the present invention, there is provided a positive electrode including a positive electrode collector, and a positive electrode active material layer formed on the positive electrode collector, wherein the positive electrode active material layer includes the above-described positive electrode active material.

According to another aspect of the present invention, there is provided a lithium secondary battery including the above-described positive electrode.

Advantageous Effects

According to the present invention, since cobalt is not included in a center portion of a positive electrode active material particle but is included in a trace amount only in a surface portion thereof, an amount of the expensive cobalt is reduced, and thus, a manufacturing unit price of a secondary battery may be reduced.

Also, surface resistance of a positive electrode active material may be reduced by disposing the cobalt in the surface portion of the positive electrode active material particle.

MODE FOR CARRYING OUT THE INVENTION

Figure 1:
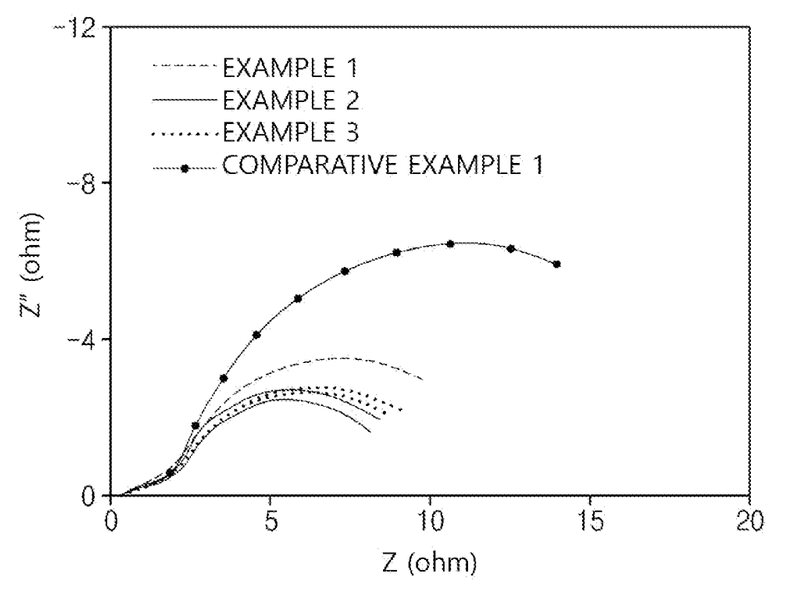
FIGURE illustrates the results of the impedance measurements of coin-type half-cells including positive electrode active materials prepared in Examples 1 to 3 and Comparative Example 1.

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

Positive Electrode Active Material

Conventionally, a positive electrode active material including high-cost cobalt was used to improve capacity characteristics and resistance characteristics. However, with respect to the cobalt metal, since it is expensive due to the limitation of reserves, there has been a disadvantage in that manufacturing costs of a secondary battery are increased.

Thus, a cobalt (Co)-less positive electrode active material containing no cobalt was studied. However, in this case, since it is difficult to form a layered structure on a surface and inside of the positive electrode active material when the positive electrode active material is used in a battery and cation mixing is increased, there has been a disadvantage in that the capacity characteristics and the resistance characteristics are degraded.

Therefore, the present inventors found that a secondary battery having high capacity and improved resistance characteristics may be prepared by using a high nickel-containing nickel-based lithium transition metal oxide having high-capacity characteristics to improve the capacity characteristics, but by including a trace amount of cobalt while the cobalt has a concentration gradient on a surface of a nickel-based lithium transition metal oxide particle in this case, thereby leading to the completion of the present invention.

Specifically, a positive electrode active material for a lithium secondary battery according to the present invention includes a nickel-based lithium transition metal oxide containing nickel in an amount of 60 mol % or more based on a total number of moles of metals excluding lithium, wherein cobalt is included in an amount of greater than 0 ppm to 6,000 ppm or less on a surface of the nickel-based lithium transition metal oxide.

The nickel-based lithium transition metal oxide contains nickel in an amount of 60 mol % or more based on the total number of moles of metals excluding lithium. In a case in which the amount of the nickel included in the nickel-based lithium transition metal oxide is less than the above range, since capacity of the positive electrode active material is reduced, there is a limitation in that it may not be used in an electrochemical device requiring high capacity. The higher the amount of the nickel within the above range is, the higher the capacity characteristics of a battery including the positive electrode active material may be exhibited. However, the higher the amount of the nickel is, the amount of the metals other than the nickel is relatively reduced, and, accordingly, charge and discharge efficiency and resistance characteristics may be poor. Thus, the positive electrode active material includes nickel in an amount of 60 mol % or more, preferably 60 mol % to 95 mol %, more preferably 70 mol % to 90 mol %, and most preferably 80 mol % to 90 mol % based on the total number of moles of transition metal elements excluding lithium.

Preferably, the nickel-based lithium transition metal oxide may be represented by the following Formula 1.

$$Li_{1+a}[Ni_xMn_yM^1_z]O_2 \qquad \text{[Formula 1]}$$

In Formula 1, $M^1$ is a doping element substituted at a transition metal site in the nickel-based lithium transition metal oxide, and may be at least one metallic element selected from the group consisting of aluminum (Al), magnesium (Mg), titanium (Ti), niobium (Nb), tungsten (W), scandium (Sc), zirconium (Zr), silicon (Si), vanadium (V), iron (Fe), yttrium (Y), and molybdenum (Mo).

1+a represents a molar ratio of lithium in the nickel-based lithium transition metal oxide, and a may satisfy $0 \leq a \leq 0.3$, and preferably $0 \leq a \leq 0.15$.

x represents a molar ratio of a nickel element in the nickel-based lithium transition metal oxide, wherein x may satisfy $0.60 \leq x < 1$, preferably $0.60 \leq x \leq 0.90$, more preferably $0.70 \leq x \leq 0.90$, and most preferably $0.80 \leq x \leq 0.90$.

y represents a molar ratio of manganese in the nickel-based lithium transition metal oxide, wherein y may satisfy $0 < y \leq 0.40$ and preferably $0 < y \leq 0.20$.

z represents a molar ratio of doping element $M^1$ in the nickel-based lithium transition metal oxide, wherein z may satisfy $0 \leq z \leq 0.35$, preferably $0 \leq z \leq 0.20$, and most preferably $0 \leq z \leq 0.10$.

When the molar ratios, x, y, and z, of the transition metals in the nickel-based lithium transition metal oxide satisfy the above ranges, a positive electrode active material having excellent energy density and exhibiting high-capacity characteristics may be obtained.

Specifically, the nickel-based lithium transition metal oxide represented by Formula 1 may be $Li_{1+a}[Ni_xMn_yAl_z]O_2$, but the present invention is not limited thereto.

According to the present invention, the positive electrode active material may include cobalt on a surface of the nickel-based lithium transition metal oxide in an amount of greater than 0 ppm to 6,000 ppm or less, preferably greater than 0 ppm to 5,892 ppm or less, and more preferably 2,000 ppm to 5,000 ppm.

In a case in which the positive electrode active material includes the cobalt on the surface of the nickel-based lithium transition metal oxide in an amount within the above range, a layered structure may not only be formed on the surface and inside of the positive electrode active material during the preparation of the positive electrode active material, but a positive electrode active material may also be provided in which high capacity and resistance characteristics may be improved without worrying about an increase in costs because the amount of the cobalt is reduced.

Also, the amount of the cobalt may be decreased while the cobalt has a concentration gradient from a surface of a positive electrode active material particle in a direction toward a center of the particle.

As described above, the amount of the cobalt of the present invention may be decreased while the cobalt has a concentration gradient from the surface of the positive electrode active material particle in the direction toward the center of the particle, and, in contrast, the amount of the nickel and/or the manganese may be increased while the nickel and/or the manganese has a concentration gradient from the surface of the positive electrode active material particle in the direction toward the center of the particle. In this case, a positive electrode active material having excellent capacity characteristics, resistance characteristics, and thermal stability may be prepared.

In the present invention, the expression "metal has a concentration gradient" denotes that the metal has a concentration distribution in which a concentration of the metal is continuously gradually changed across the entire particle or in a specific region. For example, the concentration distribution may denote that a change in the concentration of the metal per 1 μm toward the surface in the particle corresponds to a difference of 0 at % to 0.99 at %, particularly 0.1 at % to 0.9 at %, and more particularly 0.35 at % to 0.85 at % based on a total atomic weight of the corresponding metal included in the active material particle, but the present invention is not limited thereto.

Preferably, the cobalt may only be present within 2,000 nm, preferably 1,000 nm, more preferably 200 nm, and most preferably 100 nm from the surface of the positive electrode active material particle in the direction toward the center of the particle. Particularly, in a case in which the cobalt is only present within 2,000 nm from the surface of the positive electrode active material particle in the direction toward the center of the particle, a surface structure of the positive electrode active material may be improved due to the formation of the layered structure.

For example, in a case in which the cobalt is present throughout the positive electrode active material particle, the resistance characteristics of the positive electrode active material may be improved, but a problem of an increase in costs due to the use of the cobalt and a problem of a decrease in thermal stability may occur.

Method of Preparing Positive Electrode Active Material

Next, a method of preparing a positive electrode active material according to the present invention will be described.

In a case in which a positive electrode active material is prepared by including a large amount of nickel (Ni) to reduce costs due to the addition of cobalt (Co) and without including the Co at all, since it is difficult to form a layered structure of the positive electrode active material, structural stability of the positive electrode active material may be poor. Thus, since a Co raw material is mixed such that an amount of the Co in the finally prepared positive electrode active material is in a range of greater than 0 ppm to 6,000 ppm or less during the preparation of the positive electrode active material, a trace amount of the Co is included to reduce costs and the structural stability of the surface of the positive electrode active material is simultaneously improved, and accordingly, the present inventors may prepare a secondary battery having improved capacity characteristics and resistance characteristics.

The method of preparing a positive electrode active material according to an embodiment of the present invention includes the steps of: preparing a transition metal hydroxide which contains nickel in an amount of 60 mol % or more based on a total number of moles of transition metals and does not contain cobalt; and mixing the transition metal hydroxide and a lithium raw material and sintering the mixture, wherein the method may further include mixing a cobalt (Co) raw material in the mixing of the transition metal hydroxide and the lithium raw material and the sintering of the mixture, or may further include mixing a cobalt (Co) raw material after the sintering.

In this case, the Co raw material is mixed in an amount such that an amount of the Co in the finally prepared positive electrode active material is in a range of greater than 0 ppm to 6,000 ppm or less.

Hereinafter, each step for preparing the positive electrode active material will be described in more detail.

First, a transition metal hydroxide, which contains nickel in an amount of 60 mol % or more based on a total number of moles of transition metals and does not contain cobalt, is prepared.

Since the transition metal hydroxide contains Ni in an amount of 60 mol % or more based on the total number of moles of metals contained in the transition metal hydroxide, in a case in which a positive electrode active material is prepared by using the transition metal hydroxide, high-capacity characteristics may be obtained when the positive electrode active material is used in a battery, and the problem of the increase in costs due to the use of the Co may be addressed because the Co is not contained.

The transition metal hydroxide, for example, may be a transition metal hydroxide containing nickel, manganese, and doping element $M^1$.

Preferably, the transition metal hydroxide may be represented by the following Formula 2.

$$Ni_{x1}Mn_{y1}M^1_{z1}(OH)_2 \qquad \text{[Formula 2]}$$

In Formula 2, $M^1$ is a doping element substituted at a transition metal site in the transition metal hydroxide, and may be at least one metallic element selected from the group consisting of Al, Mg, Ti, Nb, W, Sc, Zr, Si, V, Fe, Y, and Mo.

x1 represents a molar ratio of a nickel element in the transition metal hydroxide, wherein x1 may satisfy $0.60 \le x1 < 1$, preferably $0.60 \le x1 \le 0.90$, more preferably $0.70 \le x1 \le 0.90$, and most preferably $0.80 \le x1 \le 0.90$.

y1 represents a molar ratio of manganese in the transition metal hydroxide, wherein y1 may satisfy $0 < y1 \le 0.40$ and preferably $0 < y1 \le 0.20$.

z1 represents a molar ratio of the doping element $M^1$ in the transition metal hydroxide, wherein z1 may satisfy $0 \le z1 \le 0.35$, preferably $0 \le z1 \le 0.20$, and most preferably $0 \le z1 \le 0.10$.

Subsequently, the transition metal hydroxide and a lithium raw material are mixed and sintered to prepare a positive electrode active material. In the present invention, mixing a cobalt (Co) raw material with the transition metal hydroxide and the lithium raw material may be further included in the mixing of the transition metal hydroxide and the lithium raw material and the sintering of the mixture, or mixing a Co raw material may be further included after the sintering, and, in this case, the Co raw material is mixed in an amount such that an amount of the Co in the finally prepared positive electrode active material is in a range of greater than 0 ppm to 6,000 ppm or less.

As described above, since a small amount of the Co raw material is mixed in the sintering or after the sintering, a positive electrode active material, in which a trace amount of the Co is only present on the surface of the positive electrode active material, may be prepared.

In a case in which the Co raw material is mixed after the sintering, high-temperature sintering may be further performed in order for the Co to adhere to the surface of the positive electrode active material.

The lithium raw material is not particularly limited as long as it is a compound including lithium, but, preferably, at least one selected from the group consisting of lithium carbonate ($Li_2CO_3$), lithium hydroxide (LiOH), $LiNO_3$, $CH_3COOLi$, and $Li_2(COO)_2$ may be used.

An amount of the lithium raw material used may be determined according to amounts of lithium and metal in the finally prepared positive electrode active material, and, specifically, the lithium raw material may be used in an amount such that a molar ratio (molar ratio of lithium/metallic element) of lithium included in the lithium raw material to the transition metal element included in the transition metal hydroxide is 1 or more, for example, 1.0 to 1.30.

The sintering may be performed in a temperature range of 700° C. to 950° C., preferably 700° C. to 900° C., and more preferably 750° C. to 900° C.

For example, the Co raw material may include at least one selected from the group consisting of $Co(OH)_2$, $Co_2O_3$, $Co_3(PO_4)_2$, $CoF_3$, CoOOH, $Co(OCOCH_3)_2 \cdot 4H_2O$, $Co(NO_3) \cdot 6H_2O$, $Co_3O_4$, $Co(SO_4)_2 \cdot 7H_2O$, and $COC_2O_4$.

In this case, the Co raw material may be mixed in an amount such that the amount of the Co in the finally prepared positive electrode active material is in a range of greater than 0 ppm to 6,000 ppm or less, for example, 2,000 ppm to 5,000 ppm.

In a case in which the trace amount of the Co is added during the preparation of the positive electrode active material by the above-described method, the Co may be present while particularly having a concentration gradient in a form that gradually decreases from the surface of the positive electrode active material particle toward the center of the particle, and, since this improves surface stability of the positive electrode active material, a secondary battery having excellent capacity characteristics, resistance characteristics, and life characteristics may be prepared at a low cost when the positive electrode active material is used in the battery.

Also, a method of preparing a positive electrode active material according to another embodiment of the present invention includes the steps of: preparing a transition metal aqueous solution containing a nickel raw material and a cobalt raw material; preparing a transition metal hydroxide by a co-precipitation reaction of the transition metal aqueous solution; and mixing the transition metal hydroxide and a lithium raw material and sintering the mixture, wherein, in this case, the nickel raw material is included in an amount such that an atomic ratio of nickel is 60 mol % or more based on a total number of moles of transition metals in the transition metal aqueous solution, and the cobalt raw material is mixed in an amount such that an amount of Co in the finally prepared positive electrode active material is in a range of greater than 0 ppm to 6,000 ppm or less.

For example, the Ni raw material may include $Ni(OH)_2$, NiO, NiOOH, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, or a nickel halide, and a mixture of at least one thereof may be used.

For example, the Co raw material may include at least one selected from the group consisting of $Co(OH)_2$, $Co_2O_3$, $Co_3(PO_4)_2$, $CoF_3$, CoOOH, $Co(OCOCH_3)_2 \cdot 4H_2O$, $Co(NO_3) \cdot 6H_2O$, $Co_3O_4$, $Co(SO_4)_2 \cdot 7H_2O$, and $CoC_2O_4$.

In this case, the Co raw material may be mixed in an amount such that the amount of the Co in the finally prepared positive electrode active material is in a range of greater than 0 ppm to 6,000 ppm or less, for example, 2,000 ppm to 5,000 ppm.

Furthermore, the transition metal aqueous solution may further contain a manganese raw material.

The manganese raw material may include manganese element-containing oxides, hydroxides, oxyhydroxides, carbonates, sulfates, halides, sulfides, acetic acid salts, carboxylates, or a combination thereof, and may specifically include $MnO_2$, $MnCl_2$, $MnCO_3$, $Mn_3O_4$, $MnSO_4$, $Mn_2O_3$, and $Mn(NO_3)_2$.

A doping element $M^1$-containing raw material may be further selectively included during the co-precipitation reaction, if necessary.

The doping element $M^1$-containing raw material may include doping element $M^1$-containing oxides, hydroxides, oxyhydroxides, sulfates, carbonates, halides, sulfides, acetic acid salts, carboxylates, or a combination thereof, and, for example, the $M^1$-containing raw material may further include oxides, hydroxides, oxyhydroxides, sulfates, carbonates, halides, sulfides, acetic acid salts, or carboxylates which include at least one metallic element selected from the group consisting of Al, Mg, Ti, Nb, W, Sc, Zr, Si, V, Fe, Y, and Mo, or a combination thereof, but the present invention is not limited thereto.

In a case in which the positive electrode active material is prepared by the above-described method, since the layered structure may be easily formed on the surface and inside of the positive electrode active material while the trace amount of the Co is included in the positive electrode active material, a secondary battery having excellent capacity characteristics, resistance characteristics, and life characteristics may be prepared at a low cost when the positive electrode active material is used in the battery.

Positive Electrode

Next, a positive electrode for a lithium secondary battery according to the present invention will be described.

The positive electrode according to the present invention includes a positive electrode collector and a positive electrode active material layer formed on the positive electrode collector, wherein the positive electrode active material layer includes the positive electrode active material according to the present invention and includes a conductive agent and/or a binder, if necessary.

In this case, since the positive electrode active material is the same as described above, detailed descriptions thereof will be omitted, and the remaining configurations will be only described in detail below.

The positive electrode active material may be included in an amount of 80 parts by weight to 99.5 parts by weight, for example, 85 parts by weight to 99 parts by weight based on 100 parts by weight of a total weight of the positive electrode active material layer. When the positive electrode active material is included in an amount within the above range, excellent capacity characteristics may be obtained.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be included in an amount of 0.1 part by weight to 15 parts by weight based on 100 parts by weight of the total weight of the positive electrode active material layer.

The binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 part by weight to 15 parts by weight based on 100 parts by weight of the total weight of the positive electrode active material layer.

The positive electrode of the present invention may be prepared according to a typical method of preparing a positive electrode except that the above-described positive electrode active material is used. Specifically, a positive electrode material mixture, which is prepared by dissolving or dispersing the positive electrode active material as well as selectively the binder and/or the conductive agent in a solvent, is coated on the positive electrode collector, and the positive electrode may then be prepared by drying and rolling the coated positive electrode collector.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the positive electrode material mixture is adjusted to have appropriate viscosity in consideration of a coating thickness of a slurry and manufacturing yield.

Also, as another method, the positive electrode may be prepared by casting the positive electrode material mixture on a separate support and then laminating a film separated from the support on the positive electrode collector.

Lithium Secondary Battery

Furthermore, in the present invention, an electrochemical device including the positive electrode may be prepared. The electrochemical device may specifically be a battery or a capacitor, and may more specifically be a lithium secondary battery.

The lithium secondary battery specifically includes a positive electrode, a negative electrode disposed to face the positive electrode, a separator disposed between the positive electrode and the negative electrode, and an electrolyte, wherein, since the positive electrode is the same as described above, detailed descriptions thereof will be omitted, and the remaining configurations will be only described in detail below.

Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta(0<\beta<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 parts by weight to 99 parts by weight based on 100 parts by weight of a total weight of the negative electrode active material layer.

The binder is a component that assists in the binding between the conductive agent, the active material, and the current collector, wherein the binder is typically added in an amount of 0.1 part by weight to 10 parts by weight based on 100 parts by weight of the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluoro rubber, and various copolymers thereof.

The conductive agent is a component for further improving conductivity of the negative electrode active material, wherein the conductive agent may be added in an amount of 10 parts by weight or less, for example, 5 parts by weight or less based on 100 parts by weight of the total weight of the negative electrode active material layer. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

For example, the negative electrode active material layer may be prepared by coating a negative electrode material mixture, which is prepared by dissolving or dispersing selectively the binder and the conductive agent as well as the negative electrode active material in a solvent, on the negative electrode collector and drying the coated negative electrode collector, or may be prepared by casting the negative electrode material mixture on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphorictriamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte in addition to the electrolyte components. In this case, the additive may be included in an amount of 0.1 part by weight to 5 parts by weight based on 100 parts by weight of a total weight of the electrolyte.

As described above, since the lithium secondary battery including the positive electrode active material according to the present invention stably exhibits excellent discharge capacity, output characteristics, and life characteristics, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples. The invention may, however, be embodied in many different forms and should not be construed as being limited to the embodiments set forth herein. Rther, these example embodiments are provided so that this description will be thorough and complete, and will fully convey the scope of the present invention to those skilled in the art.

EXAMPLES

Example 1

$NiSO_4$, $MnSO_4$, and $Al_2(SO_4)_3$ were dissolved in ion-exchanged water in amounts such that a molar ratio of nickel:manganese:aluminum was 86:12:2 to prepare a 2 M transition metal aqueous solution.

A container containing the transition metal aqueous solution was connected to a 5 L batch-type reactor set at 40° C. In addition, a 2.2 M aqueous ammonium solution and a 40% aqueous sodium hydroxide solution were prepared and connected to the reactor, respectively. 4 L of deionized water was put in the reactor, the reactor was then purged with nitrogen gas at a rate of 0.2 L/min to remove dissolved oxygen in the water, and a non-oxidizing atmosphere was created in the reactor.

Thereafter, the transition metal aqueous solution, the aqueous sodium hydroxide solution, and the aqueous ammonium solution were added to the reactor at rates of 0.3 mL/min, 0.2 mL/min, and 0.2 mL/min, respectively, and subjected to a co-precipitation reaction for 10 hours to precipitate particles of a transition metal hydroxide. The precipitated particles of the transition metal hydroxide were separated, washed, and then dried at 130° C. for 10 hours to prepare a positive electrode active material precursor.

The above-prepared positive electrode active material precursor and LiOH were mixed so that a molar ratio of transition metal:lithium (Li) was 1:1.03, $Co_3O_4$ was added to the mixture, in which the positive electrode active material precursor and the lithium source were mixed, in an amount such that an amount of Co in a finally prepared positive electrode active material was 4,000 ppm, and sintering was then performed at 800° C. for 10 hours in an oxygen atmosphere to prepare the positive electrode active material.

Example 2

A positive electrode active material precursor was prepared in the same manner as in Example 1 except that $Co_3O_4$ was added to the transition metal aqueous solution of Example 1 in an amount such that an amount of Co in a finally prepared positive electrode active material was 2,000 ppm. The above-prepared positive electrode active material precursor and LiOH were mixed so that a molar ratio of transition metal:Li was 1:1.03, and sintering was performed at 800° C. for 10 hours in an oxygen atmosphere to prepare the positive electrode active material.

Example 3

The positive electrode active material precursor prepared in Example 1 and LiOH were mixed so that a molar ratio of transition metal:Li was 1:1.03, and sintering was performed at 800° C. for 10 hours in an oxygen atmosphere to prepare a lithium transition metal oxide. Subsequently, $Co_3O_4$ was mixed to the lithium transition metal oxide in an amount such that an amount of Co in a finally prepared positive electrode active material was 5,000 ppm, and a heat treatment was performed at 800° C. for 10 hours in an oxygen atmosphere to prepare the positive electrode active material in which Co was coated on a surface of the lithium transition metal oxide.

Comparative Example 1

The positive electrode active material precursor prepared in Example 1 and LiOH were mixed so that a molar ratio of transition metal:Li was 1:1.03, and sintering was performed at 800° C. for 10 hours in an oxygen atmosphere to prepare a positive electrode active material.

Comparative Example 2

$NiSO_4$, $MnSO_4$, and $CO_3O_4$ were dissolved in ion-exchanged water in amounts such that a molar ratio of nickel:manganese:cobalt was 86:12:2 to prepare a 2 M transition metal aqueous solution, and a positive electrode active material precursor was prepared in the same manner as in Example 1 by using the transition metal aqueous solution.

The above-prepared positive electrode active material precursor and LiOH were mixed so that a molar ratio of transition metal:Li was 1:1.03, and sintering was performed at 800° C. for 10 hours in an oxygen atmosphere to prepare a positive electrode active material. In this case, the amount of the Co included in the positive electrode active material was 11,600 ppm based on 100 parts by weight of the positive electrode active material.

Experimental Example 1: Analysis of Co Content in Positive Electrode Active Material Concentration gradients of Co in the positive electrode active materials prepared in Examples 1 to 3 and Comparative Example 1 were confirmed by a depth profile using X-ray photoelectron spectroscopy (XPS, Thermo Scientific) of the positive electrode active materials prepared in Examples 1 to 3 and Comparative Example 1, and the results thereof are presented in Table 1 below.

Specifically, after particles of each of the positive electrode active materials prepared in Examples 1 to 3 and Comparative Example 1 were added to a chamber in a vacuum state, an amount of the Co present on the surface of the positive electrode active material depending on etching time was confirmed while etching the positive electrode active material particles using an argon (Ar) beam, and the results thereof are presented in Table 1 below. In this case, the surface of the positive electrode active material particle was etched by 1 nm per 10 seconds of the etching time.

TABLE 1

| | Co content (at %) | | | |
|---|---|---|---|---|
| Etching time (s) | Example 1 | Example 2 | Example 3 | Comparative Example 1 |
| 0 | 0.6 | 0.5 | 0.7 | 0 |
| 10 | 0.5 | 0.6 | 0.8 | 0 |
| 30 | 0.4 | 0.5 | 0.7 | 0 |
| 50 | 0.6 | 0.4 | 0.6 | 0 |
| 100 | 0.6 | 0.6 | 0.5 | 0 |
| 150 | 0.5 | 0.5 | 0.3 | 0 |
| 200 | 0.5 | 0.5 | 0.2 | 0 |
| 300 | 0.4 | 0.6 | 0.2 | 0 |
| 500 | 0.4 | 0.4 | 0 | 0 |
| 1,000 | 0.3 | 0.3 | 0 | 0 |

As illustrated in Table 1, with respect to the positive electrode active material particles prepared in Examples 1 and 2, it may be confirmed by etching a surface of the positive electrode active material particle for 1,000 seconds that Co was present from the surface of the positive electrode active material particle to 100 nm in a direction toward the center of the particle.

With respect to the positive electrode active material prepared in Example 3, since it was prepared by preparing the lithium transition metal oxide and then mixing the Co raw material therewith, a large amount of cobalt was distributed in a surface portion of the particle and the amount of the cobalt was significantly decreased toward the center of the particle, and thus, it may be confirmed that the Co was only present from the surface of the particle to about 30 nm in the direction toward the center of the particle.

Experimental Example 2: Capacity Measurement

After lithium secondary batteries respectively including the positive electrode active materials prepared in Examples 1 to 3 and Comparative Examples 1 and 2 were prepared, capacity characteristics of the secondary batteries were compared.

In this case, the secondary batteries were prepared in the same manner as described below except that the positive electrode active materials respectively prepared in Examples 1 to 3 and Comparative Examples 1 and 2 were used. Specifically, each of the positive electrode active materials respectively prepared in Examples 1 to 3 and Comparative Examples 1 and 2, a super-P conductive agent, and a polyvinylidene fluoride (PVDF) binder were mixed in a weight ratio of 95:2:3 in an N-methylpyrrolidone solvent to prepare a composition for forming a positive electrode. A 20 µm thick aluminum current collector was coated with the composition for forming a positive electrode, dried, and then roll-pressed to prepare a positive electrode. Subsequently, graphite as a negative electrode active material, a super-C65 conductive agent, and a styrene-butadiene rubber binder were mixed in a weight ratio of 96:2:2, and the mixture was added to $H_2O$, as a solvent, to prepare a negative electrode active material slurry. A 20 µm thick copper current collector was coated with the negative electrode active material slurry, dried, and then roll-pressed to prepare a negative electrode.

After the above-prepared positive electrode and negative electrode were stacked with a polyethylene (PE) separator to prepare a polymer type battery by a conventional method, the polymer type battery was put in a battery case and an electrolyte solution, in which 1 M $LiPF_6$ was dissolved in a mixed solvent in which ethylene carbonate (EC) and ethylmethyl carbonate (EMC) were mixed in a volume ratio of 3:7, was injected thereinto to prepare each of the lithium secondary batteries according to Examples 1 to 3 and Comparative Examples 1 and 2.

Each of the lithium secondary batteries of Examples 1 to 3 and Comparative Examples 1 and 2 prepared as described above was charged at a constant current of 0.1 C to 4.25 V at 25° C. and cut-off charged at 0.05 C. Thereafter, each lithium secondary battery was discharged at a constant current of 0.1 C to a voltage of 3.0 V, charge and discharge capacities in this case and charge and discharge efficiency were measured, and the results thereof presented in Table 2 below.

TABLE 2

| | Charge capacity (mAh/g) | Discharge capacity (mAh/g) | Efficiency (%) |
|---|---|---|---|
| Example 1 | 228.3 | 204.2 | 89.4 |
| Example 2 | 228.9 | 203.7 | 89.0 |
| Example 3 | 227.8 | 206.6 | 90.7 |
| Comparative Example 1 | 227.1 | 201.2 | 88.4 |
| Comparative Example 2 | 227.2 | 206.5 | 90.9 |

As illustrated in Table 2, with respect to the positive electrode active material particles prepared in Examples 1 to 3 of the present invention, it may be confirmed that charge and discharge capacities and charge and discharge efficiency were better than those of the positive electrode active material prepared in Comparative Example 1. In addition, it may be confirmed that the results were equivalent or similar to those of a case in which an excessive amount of Co relative to the present invention was included as in Comparative Example 2.

Experimental Example 3: High-Temperature Characteristics Check

Each of the lithium secondary batteries of Examples 1 to 3 and Comparative Examples 1 and 2 prepared in Experimental Example 2 was charged at a constant current of 0.33 C to 4.2 V at 45° C. and cut-off charged at 0.05 C. Thereafter, each lithium secondary battery was discharged at a constant current of 0.33 C to a voltage of 3.0 V. The charging and discharging behaviors were set as one cycle, and, after this cycle was repeated 30 times, capacity retentions and resistance increase rates of the lithium secondary batteries according to Examples 1 to 3 and Comparative Examples 1 and 2 were measured, and the results thereof are presented in Table 3 below.

TABLE 3

| | Capacity retention (%) | Resistance increase rate (%) |
|---|---|---|
| Example 1 | 95.6 | 50 |
| Example 2 | 95.1 | 59 |
| Example 3 | 96.6 | 41 |
| Comparative Example 1 | 91.2 | 120 |
| Comparative Example 2 | 96.0 | 49 |

As illustrated in Table 3, it may be confirmed that the secondary batteries prepared in Examples 1 to 3 each had a high capacity retention of 95% or more, which was equivalent to that of Comparative Example 2 including the excessive amount of Co, even after 30 charge and discharge cycles, and it may also be confirmed that resistance increase rates were significantly improved in comparison to that of Comparative Example 1.

Experimental Example 4: Resistance Characteristics Check

Resistance characteristics of the lithium secondary batteries of Examples 1 to 3 and Comparative Example 1 prepared in Experimental Example 2 were checked. Each resistance value was measured using electrochemical impedance spectroscopy (EIS). Specifically, after the lithium secondary batteries (coin half-cells) were prepared, resistance values were measured at a frequency of 0.1 Hz to 300,000 Hz and an AC amplitude of 10 mA using Solartron analytical EIS (Solartron Analytical), and the results thereof are presented in FIGURE.

As illustrated in FIGURE, with respect to the secondary batteries prepared in Examples 1 to 3, it may be confirmed that resistance characteristics were better than those of the secondary battery prepared in Comparative Example 1.

The invention claimed is:

1. A positive electrode active material comprising:
a nickel-based lithium transition metal oxide containing nickel in an amount of 60 mol % or more based on a total number of moles of metals excluding lithium; and
a cobalt,
wherein the cobalt is included in an amount of 2,000 ppm to 5,000 ppm relative to a total weight of the positive electrode active material, in a surface portion of the nickel-based lithium transition metal oxide,
wherein the nickel-based lithium transition metal oxide is represented by Formula 1:

[Formula 1]

wherein, in Formula 1,
$M^1$ is, $0 \leq a \leq 0.3$, $0.60 \leq x < 1$, $0 < y \leq 0.40$, and $0 \leq z \leq 0.35$, and
wherein at least one of the nickel or manganese has a concentration gradient from a surface of a positive electrode active material particle, and wherein the amount of the nickel or the manganese is increased in a direction toward a center of the positive electrode active material particle.

2. The positive electrode active material of claim 1, wherein the cobalt has a concentration gradient from the surface of a positive electrode active material particle, and wherein the amount of the cobalt is decreased in the direction toward the center of the positive electrode active material particle.

3. The positive electrode active material of claim 1, wherein the cobalt is present within 2,000 nm from the surface of the positive electrode active material particle in the direction toward the center of the positive electrode active material particle.

4. A positive electrode comprising:
a positive electrode collector, and a positive electrode active material layer formed on the positive electrode collector,
wherein the positive electrode active material layer comprises the positive electrode active material of claim 1.

5. A lithium secondary battery comprising the positive electrode of claim 4.

* * * * *